US008660487B2

(12) United States Patent  
Kargl et al.

(10) Patent No.: US 8,660,487 B2
(45) Date of Patent: Feb. 25, 2014

(54) CONTACTLESS DATA TRANSMISSION

(75) Inventors: Walter Kargl, Graz (AT); Edmund Ehrlich, Graz (AT); Matthias Emsenhuber, Graz (AT)

(73) Assignee: Infineon Technologies AG, Neubiberg (DE)

( * ) Notice: Subject to any disclaimer, the term of this patent is extended or adjusted under 35 U.S.C. 154(b) by 499 days.

(21) Appl. No.: 12/477,293

(22) Filed: Jun. 3, 2009

(65) Prior Publication Data

US 2010/0311328 A1 Dec. 9, 2010

(51) Int. Cl.
 *H04B 7/00* (2006.01)
(52) U.S. Cl.
 USPC .......... 455/41.2; 235/439; 235/451; 235/492; 320/137; 340/10.1; 340/10.3; 340/10.34; 340/572.1; 340/10.5; 343/742; 343/741; 343/866
(58) Field of Classification Search
 USPC .......... 455/41.2; 235/439, 451, 492; 320/137; 340/10.1, 10.3, 10.34, 572.1, 10.5; 343/742, 741, 866
 See application file for complete search history.

(56) References Cited

U.S. PATENT DOCUMENTS

| 4,922,261 | A | 5/1990 | O'Farrell |
| 5,099,227 | A | 3/1992 | Geiszler et al. |
| 5,374,930 | A | 12/1994 | Schuermann |
| 5,440,302 | A | 8/1995 | Irmer et al. |
| 5,796,180 | A * | 8/1998 | Glehr .......................... 340/10.34 |
| 6,774,859 | B2 * | 8/2004 | Schantz et al. ................ 343/742 |
| 2005/0077357 | A1 * | 4/2005 | Roux ............................. 235/451 |
| 2005/0174239 | A1 * | 8/2005 | Shanks et al. .............. 340/572.1 |
| 2006/0103535 | A1 * | 5/2006 | Pahlaven et al. ........... 340/572.1 |
| 2009/0250517 | A1 * | 10/2009 | Brandin et al. ................ 235/439 |
| 2010/0214065 | A1 * | 8/2010 | Maltseff et al. .............. 340/10.1 |
| 2010/0253481 | A1 * | 10/2010 | Zand ............................ 340/10.3 |
| 2011/0140671 | A1 * | 6/2011 | Kim et al. ..................... 320/137 |

FOREIGN PATENT DOCUMENTS

| EP | 0 466 949 | | 1/1992 |
| JP | 63-502394 | A | 9/1988 |
| JP | 4-500896 | A | 2/1992 |
| JP | 7-131376 | A | 5/1995 |
| JP | 09-073524 | A | 3/1997 |
| JP | 9-98014 | A | 4/1997 |
| JP | 09-321652 | A | 12/1997 |
| JP | 10-145443 | A | 5/1998 |
| JP | 11-039441 | A | 2/1999 |
| JP | 11-298368 | A | 10/1999 |
| JP | 2007-110577 | A | 4/2007 |
| WO | WO-87/04865 | A1 | 8/1987 |
| WO | WO-91/01531 | A1 | 2/1991 |
| WO | WO-2006/109701 | A1 | 10/2006 |

\* cited by examiner

*Primary Examiner* — April G Gonzales
(74) *Attorney, Agent, or Firm* — Schiff Hardin LLP

(57) ABSTRACT

A contactless device having an energy antenna configured to transmit/receive an energy signal; and a data antenna configured to transmit a data signal. Also, a method for transmitting a contactless signal including transmitting/receiving an energy signal from an energy antenna of a contactless device; and transmitting a data signal from a data antenna of the contactless device.

24 Claims, 6 Drawing Sheets

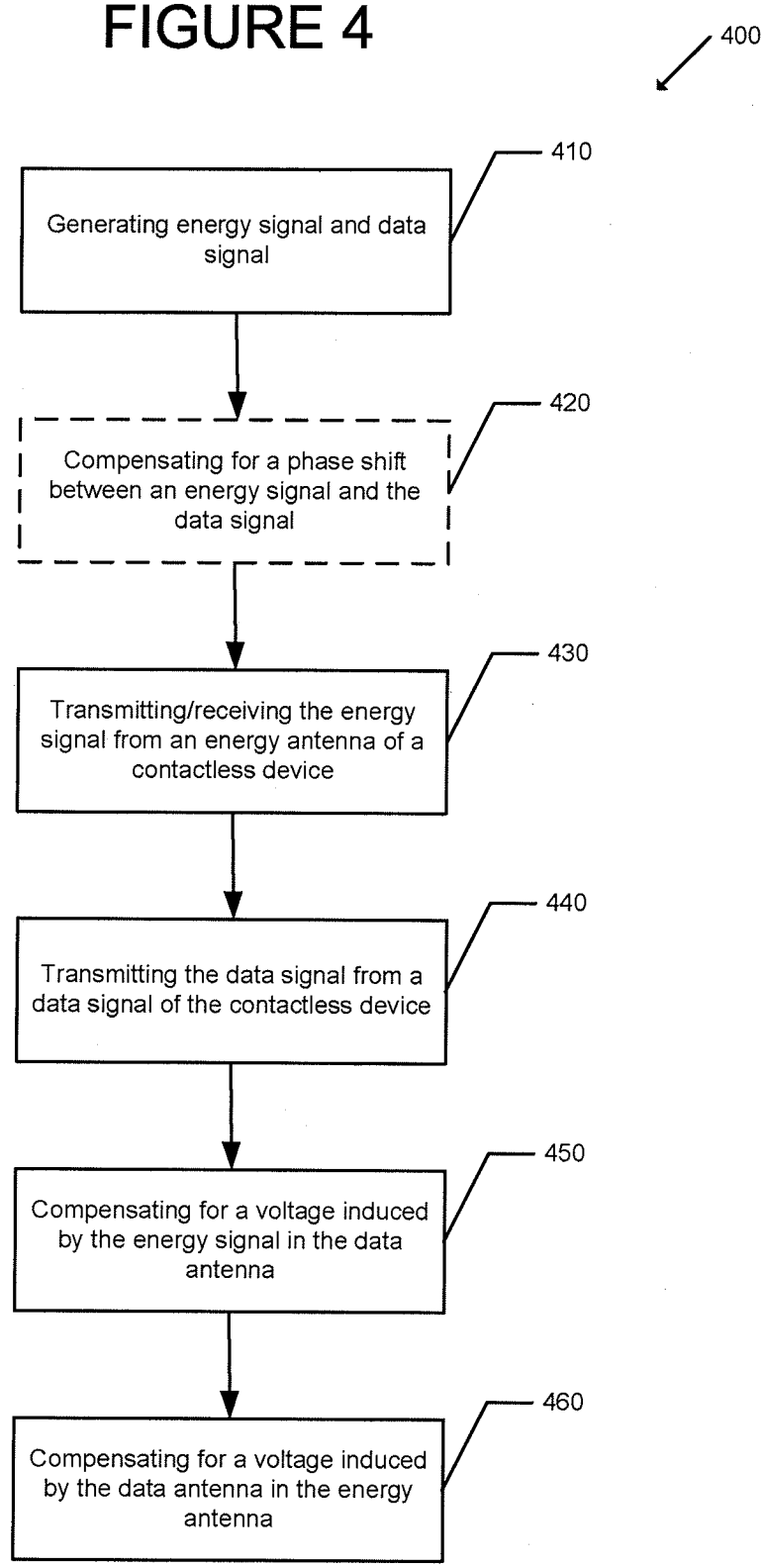

CONTACTLESS DATA TRANSMISSION

BACKGROUND

The present invention is directed to a contactless communication system having a high bit rate contactless data transfer.

FIG. 7 illustrates a known contactless communication system 700. The basic components of contactless communication system 700 are reader 710 and contactless card 720.

Reader 710 is also known as a Proximity Coupling Device (PCD). Reader 710 includes generator voltage $U_0$, transmission antenna $L_{PCD}$, resonance capacitor $C_{res}$, and resistor $R_Q$. Transmission antenna $L_{PCD}$ and resonance capacitor $C_{res}$ are configured to be in resonance, such that at a predetermined frequency, only resistor $R_Q$ is seen from the perspective of the generator voltage $U_0$.

Contactless card 720 is also known as a Proximity Integrated Circuit Chip (PICC), a smart card, a tag, a transponder, or a Radio Frequency Identification (RFID) tag. Contactless card 720 includes an inductive antenna $L_{PICC}$, resonance capacitor $C_{PICC}$, and energy consuming resistor $R_{PICC}$. Antenna $L_{PICC}$ and resonance capacitor $C_{PICC}$ form a resonance circuit, and are configured to provide contactless card 720 with a specific resonance frequency.

In operation, transmission antenna $L_{PCD}$ transmits a carrier signal, typically having a frequency of 13.56 MHz, which generates a transmission field to supply the contactless card 720 with both energy and data. Data can be transmitted to contactless card 720 by modulation of the carrier signal. When contactless card 720 penetrates the transmission field of reader 710, the transmission field induces a current in card antenna $L_{PICC}$, and the transmission antenna $L_{PCD}$ and card antenna $L_{PICC}$ are said to be coupled. A voltage corresponding to the induced current is then multiplied by the resonance circuit. In some implementations, contactless card 720 is configured to transmit a response signal, which is provided as the carrier signal with data modulated on a subcarrier frequency, typically at a frequency of 848 KHz. The response signal generates a response field that is detected by the transmission antenna $L_{PCD}$ of reader 710.

In known systems such as contactless system 700, the communication protocol between the reader and the contactless card may be defined by any of numerous ISO (International Organization for Standardization) standards, such as 14443 Type A/B, 18092, 15693, 18000, etc.

The data communication and energy supplied during downlink communication from the reader 710 to the contactless card 720 is accomplished with a single transmission antenna $L_{PCD}$. To optimize energy transfer and operating distance, the reader's resonance circuit, comprising resonance capacitor $C_{res}$ and transmission antenna $L_{PCD}$, focuses on the carrier frequency and is often designed to have a high quality (Q) factor. The bandwidth is reciprocal to the Q factor, and thus the resulting bandwidth is low. Also, a high Q factor resonance circuit will attenuate the data-modulated carrier signal and affect the settling time of the signal. For standardized data rates (such as up to 848 kbit/sec), the downlink bandwidth of reader 710 is adequate to fulfill the transmission requirements. Higher data rates (such as above 848 kbit/sec) demand a larger bandwidth but without reduction of quality factor Q.

BRIEF DESCRIPTION OF THE DRAWINGS

FIG. 4 illustrates a contactless communication method according to an embodiment.

DETAILED DESCRIPTION

The present application is directed to a contactless communication system and method of transmitting data between contactless devices (e.g., a reader or contactless card) at high baudrates without sacrificing communication quality.

The contactless device includes an additional transmission antenna. The existing transmission antenna transmits/receives only an energy signal. This existing antenna, referred to herein as an energy antenna, has a resonant circuit with a high quality (Q) factor and effectively a narrow bandwidth. Data transmission, on the other hand, is accomplished using the additional antenna, referred to herein as a data antenna, to transmit a data signal. Unlike the energy antenna, the data antenna is a wideband antenna and is not matched to resonance or matched with a low quality (Q) factor. Signal suppression is used to cancel an influence of the signal of each of the antennas on the other. This signal suppression can be done geometrically or by using a voltage compensation source.

Figure 7:
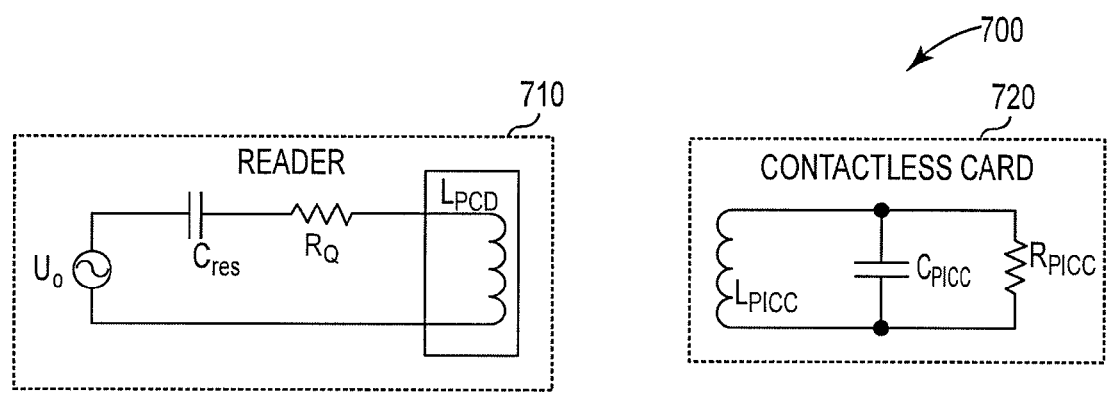
FIG. 7 illustrates a known contactless communication system.

It is noted that some of the components of the embodiments shown in the figures described below are also used in the known contactless communication system 700 of FIG. 7. Accordingly, these components are illustrated using the same or similar reference symbols. For the sake of brevity, their descriptions will not be repeated for each embodiment.

Figure 1A:
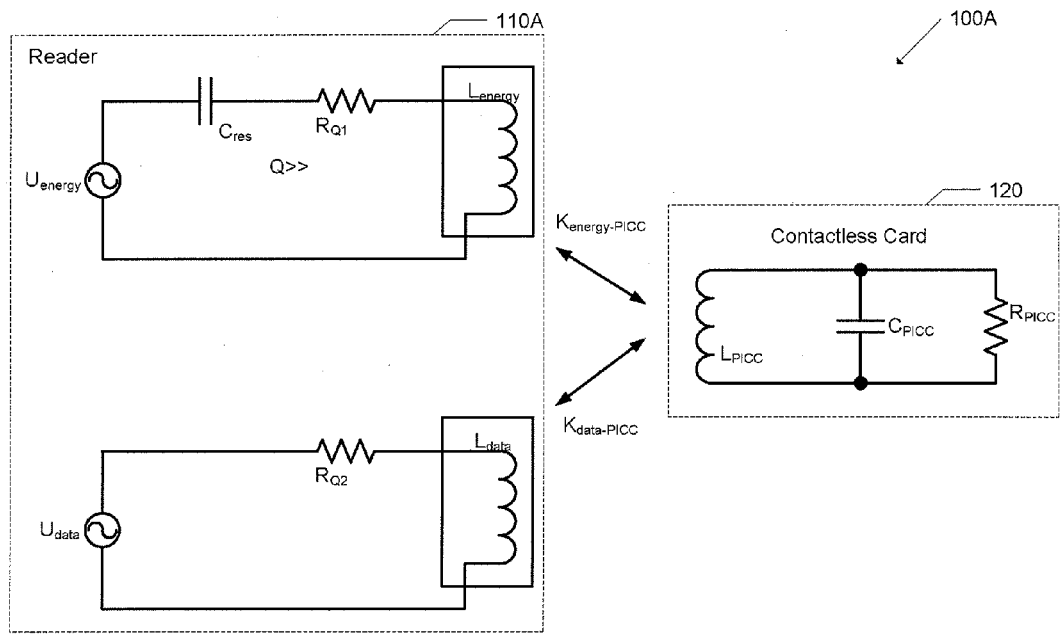
FIG. 1A illustrates a contactless communication system according to an embodiment.

FIG. 1A illustrates a contactless communication system 100A according to an embodiment.

As shown, contactless communication system 100A includes reader 110A and contactless card 120. Contactless card 120 is configured the same as contactless card 720 described above with respect to FIG. 7, and thus its description need not be repeated here.

Reader 110A includes an energy antenna $L_{energy}$ and data antenna $L_{data}$. When contactless card 120 is within the transmission field of reader 110A, energy antenna $L_{energy}$ can couple with card antenna $L_{PICC}$ at a coupling coefficient $K_{energy\text{-}PICC}$, and data antenna $L_{data}$ at a coupling coefficient $k_{data\text{-}PICC}$.

Energy antenna $L_{energy}$ has coupled thereto an energy generator voltage $U_{energy}$, resonance capacitor $C_{res}$, and resistor $R_{Q1}$. Energy antenna $L_{energy}$ and resonance capacitor $C_{res}$ are configured to form a resonance circuit, such that at a predetermined frequency, only resistor $R_{Q1}$ is seen from the perspective of the energy generator voltage $U_{energy}$. For effective energy transfer, energy antenna $L_{energy}$ has a high quality factor and thus a narrow bandwidth.

The data antenna $L_{data}$ has coupled thereto a data generator voltage $U_{data}$ and resistor $R_{Q2}$. Unlike energy antenna $L_{energy}$, data antenna $L_{data}$ is not coupled to a resonance capacitor.

Data antenna $L_{data}$ is typically located in a same plane as energy antenna $L_{energy}$, though it is recognized that this is not necessarily required.

Signal suppression is used to cancel interactions between energy antenna $L_{energy}$ and data antenna $L_{data}$, that is to prevent a voltage induced by an energy antenna signal in the data antenna $L_{data}$, and to prevent a voltage induced by a data antenna signal in the energy antenna $L_{energy}$. In the case of FIG. 1A, this suppression is accomplished geometrically, that is energy antenna $L_{energy}$ and data antenna $L_{data}$ are shaped, sized, and positioned with respect to one another such that a signal transmitted by one antenna is suppressed from inducing a voltage in the other antenna. Signal suppression occurs when the energy and data signals have the same amplitude but are in opposite phase (i.e., a 180° phase shift). When the contactless card 120 is not located near the reader 110A, there is substantially complete signal suppression between energy antenna $L_{energy}$ and data antenna $L_{data}$. On the other hand, when the contactless card 120 is located with the reader's 110A transmission field, the only signal inducing a voltage in the $L_{data}$ antenna is that from the contactless card 120.

In operation, energy voltage generator $U_{energy}$ generates a voltage controlling energy antenna $L_{energy}$ to transmit an energy signal to contactless card 120. For optimum energy transfer, this energy signal is a narrowband signal, has a high quality (Q) factor, and is focused at a carrier frequency. Unlike the transmission antenna $L_{PCD}$ of the conventional system 700 described above with respect to FIG. 7, energy antenna $L_{energy}$ transmits only energy and is not modulated with data.

Concurrently, data voltage generator $U_{data}$ generates a voltage controlling data antenna $L_{data}$ to transmit a data signal to contactless card 120, as will be described in further detail below. This data signal is not influenced by a resonance circuit, and thus the data signal can be wideband with little or no baudrate limitation. The energy signal and the data signal are superpositioned, that is geometrically added, in the air between reader 110A and contactless card 120 to create the reader's total transmission signal, as will also be described in further detail below. This superposition concept is being described herein as adding the energy signal and the data signal. It is appreciated, however, that these signals represent magnetic fields generated by currents in the respective antennas.

The energy antenna $L_{energy}$ has a resonance circuit, as discussed above, and thus the energy voltage source $U_{energy}$ and the energy antenna $L_{energy}$ are in-phase. In contrast, the data antenna $L_{data}$ does not have a resonance circuit, and thus there is a 90° phase shift between data voltage source $U_{data}$ and data antenna $L_{data}$. The result is the energy signal is in-phase and the data signal has a 90° phase shift. This phase shift between the energy and data signals can be compensated for digitally in any known manner.

When contactless card 120 is moved within range of the reader's total transmission signal, a current is induced in card antenna $L_{PICC}$. A voltage corresponding to the induced current is then multiplied by the series resonant circuit, i.e., the card antenna $L_{PICC}$ and the resonance capacitor $C_{PICC}$. Contactless card 120 then transmits a response signal, which is a carrier of the reader's total transmission signal with data actively modulated thereon. The reader's data antenna $L_{data}$ detects the response signal generated by the contactless card antenna $L_{PICC}$.

Figure 1B:
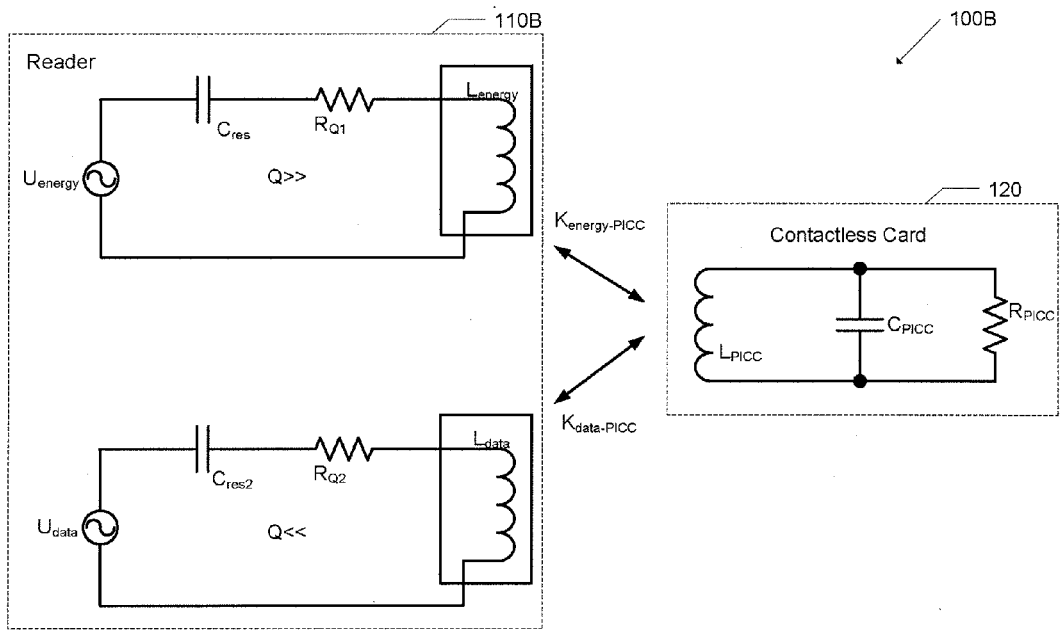
FIG. 1B illustrates a contactless communication system according to another embodiment.

FIG. 1B illustrates a contactless communication system 100B according to another embodiment in which the transmission antenna has a resonant circuit.

Contactless communication system 100B is similar to the contactless communication system 100A of FIG. 1A, except that data antenna $L_{data}$ has additionally coupled thereto resonance capacitor $C_{res2}$. Data antenna $L_{data}$ and resonance capacitor $C_{res2}$ form a resonance circuit, which has a low quality factor. Since the data antenna $L_{data}$ of FIG. 1B has a resonance circuit, the data voltage source $U_{data}$ and data antenna $L_{data}$ do not have a phase-shift relative to one another. The signals on the energy antenna $L_{energy}$ and the data antenna $L_{data}$ are in-phase, and as a result, no phase shift between the signals of the two antennas is required.

The other components of FIG. 1B are similar to the ones described above with respect to FIG. 1A, and for the sake of brevity, their descriptions will not be repeated here.

Figure 2A:
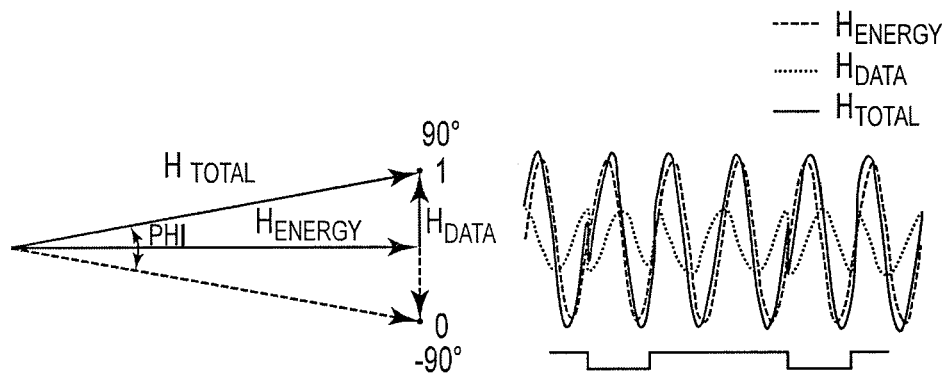
FIGS. 2A, 2B, and 2C illustrate signal diagrams of a superposition of the energy signal and data signal resulting in the total transmission signal of the reader according to respective embodiments.
Figure 2B:
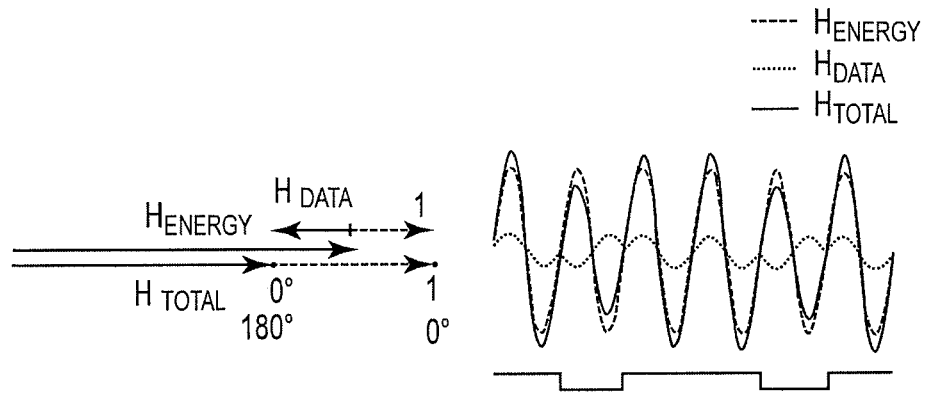
Figure 2C:
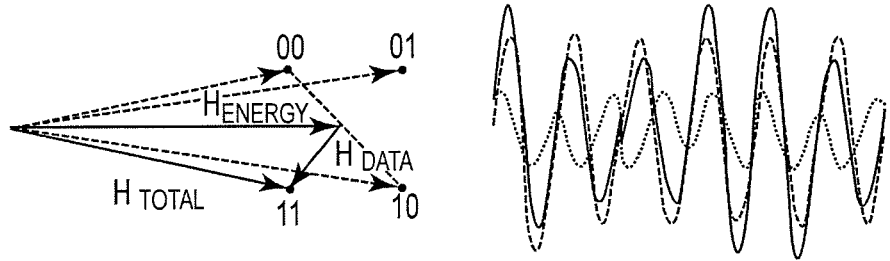

FIGS. 2A, 2B, and 2C each illustrate signal diagrams of a superposition of the energy signal and data signal resulting in the total transmission signal of the reader according to respective embodiments.

FIG. 2A a signal diagram of a superposition of the energy signal and data signal resulting in the total transmission signal of the reader when the data signal is generated using phase-shift keying (PSK) modulation performed by a modulator (not shown). PSK modulation itself is known, and thus for the sake of brevity, its details will not be included here.

The data antenna $L_{data}$ is configured to transmit a data signal, and the energy antenna $L_{energy}$ is configured to transmit an energy signal. A superposition (i.e., a geometrical addition) of the data signal $H_{data}$ and the energy signal $H_{energy}$ occurs "in the air," resulting in the reader's total transmission signal $H_{total}$. In mathematical terms, $H_{total}=H_{energy}+H_{data}$.

The energy signal $H_{energy}$ has a 0° angle and a predetermined amplitude. In FIG. 2A the energy signal $H_{energy}$ is represented in the vector diagram by the horizontal, non-bold vector, and in the signal diagram is represented by the dashed wave.

The data signal $H_{data}$ is a 90° phase-shifted signal, and is modulated −90° to represent a logic 0, or +90° to represent a logic 1. In the vector diagram the logic 1 (i.e., +90°) for this signal is represented by the vertical, non-bold, solid vector pointing upward, and the logic 0 (i.e., −90°), is represented by the vertical, non-bold, dashed vector pointing downward. In the signal diagram the data signal $H_{data}$ is represented by the dotted wave. It is noted that if no data is modulated onto the data signal, then there will be no data signal, i.e., an amplitude of 0.

The superposition of the energy signal $H_{energy}$ and the data signal $H_{data}$ in the air results in the reader's total transmission signal $H_{total}$. This total transmission signal $H_{total}$ has a ±phi angle and a resulting amplitude. In the vector diagram logic 1 (i.e., +90°) for this signal is represented by the bold, solid vector angled upward, and logic 0 (i.e., −90°) is represented by the bold, dashed vector angled downward. In the signal diagram the total transmission signal $H_{total}$ is represented by the solid wave.

During transmission, if there is no modulation, the resulting vector is that of the energy signal $H_{energy}$ because the vector of the data signal $H_{data}$ is at 0 amplitude. After PSK modulation begins on the data signal $H_{data}$, the energy signal $H_{energy}$ remains the same. To modulate the data signal $H_{data}$ with a logic 1, the data signal is shifted +90° compared with the energy signal $H_{energy}$. The solid vector of the data signal $H_{data}$ points to logic 1, and the sum of the vector of the energy signal $H_{energy}$ and the vector of the data signal $H_{data}$ results in the vector of the reader's total transmission signal $H_{total}$, which again is the solid bold vector.

Alternatively, if the data signal $H_{data}$ is modulated with a logic 0, the data signal $H_{data}$ signal is changed such that there is −90° phase shift compared with the energy signal $H_{energy}$. The vector of the data signal $H_{data}$ then points to the logic 0, and the vector of the energy signal $H_{energy}$ plus the logic 0 vector of the data signal $H_{data}$ results in the vector of the reader's data modulated transmission signal $H_{total}$ pointing to the logic 0.

During a transition from logic 1 to logic 0, and from logic 0 to logic 1, there is a 180° phase shift. This can be seen in the step of the signal timing diagram shown on the right half of FIG. 2A.

FIG. 2B a signal diagram of a superposition of the energy signal and data signal resulting in the total transmission signal of the reader when the data signal is generated using amplitude-shift keying (ASK) modulation. ASK modulation itself is known, and thus for the sake of brevity, its details will not be included here.

The energy signal $H_{energy}$ has a 0° angle and a predetermined amplitude. In FIG. 2B, the energy signal $H_{energy}$ in the vector diagram is represented by the horizontal, non-bold vector, and in the signal diagram is represented by the dashed line.

The data signal $H_{data}$ is a 0° phase-shifted signal, and is modulated with a particular amplitude and to 0° to represent a logic 1, or with a particular amplitude and to −180° to represent a logic 0. In the vector diagram the logic 0 (i.e., −180°) for this signal is represented by the horizontal, non-bold solid vector pointing to the left, and the logic 1 (i.e., 0°) is represented by the horizontal, non-bold dashed vector pointing to the right. In the signal diagram, the data signal $H_{data}$ is represented by the dotted wave.

Again, the superposition of the energy signal $H_{energy}$ and the data signal $H_{data}$ in the air results in the reader's total transmission signal $H_{total}$. In the vector diagram logic 0 (i.e., −180°) for this signal is represented by the bold, solid vector, and logic 1 (i.e., 0°) is represented by the bold, dashed vector. In the signal diagram the total transmission signal $H_{total}$ is represented by the solid wave.

During transmission, if there is no modulation, the resulting vector is that of the energy signal $H_{energy}$ because the vector of the data signal $H_{data}$ is 0 amplitude. After ASK modulation begins on the data signal $H_{data}$, the energy signal $H_{energy}$ remains the same.

To modulate the data signal $H_{data}$ with a logic 0, the data signal has a −180° phase shift compared with the energy signal $H_{energy}$. The solid vector of the data signal $H_{data}$ points to logic 0, and the sum of the vector of the energy signal $H_{energy}$ and the vector of the data signal $H_{data}$ results in the vector of the reader's total transmission signal $H_{total}$, which is the solid bold vector.

Alternatively, if the data signal $H_{data}$ is modulated with a logic 1, the data signal $H_{data}$ signal is changed such that there is 0° phase shift compared with the energy signal $H_{energy}$. The vector of the data signal $H_{data}$ then points to the logic 1, and the vector of the energy signal $H_{energy}$ plus the logic 1 vector of the data signal $H_{data}$ results in the vector of the reader's total transmission signal $H_{total}$ pointing to the logic 1.

During a transition from logic 1 to logic 0, and from logic 0 to logic 1, there is a 180° phase shift. This can be seen in the step of the signal timing diagram shown on the right half of FIG. 2B.

FIG. 2C a signal diagram of a superposition of the energy signal and data signal resulting in the total transmission signal of the reader when the data signal is generated using quadrature amplitude (QAM) modulation. QAM modulation itself is known, and thus for the sake of brevity, its details will not be included here.

As with the PSK and ASK modulation embodiments described above with respect to FIGS. 2A and 2B, respectively, the superposition of the energy signal $H_{energy}$ and the data signal $H_{data}$ in the air results in the reader's total transmission signal $H_{total}$.

The energy signal $H_{energy}$ has a 0° angle and a predetermined amplitude. In FIG. 2C the energy signal $H_{energy}$ is represented in the vector diagram by the horizontal, non-bold vector, and in the signal diagram is represented by the dashed wave.

The data signal $H_{data}$ is phase-shifted 135° to represent a logic 00, 45° to represent logic 01, −45° to represent logic 10, and −135° to 225° to represent logic 11. The vector of the data signal $H_{data}$ is a pure QAM vector. The superposition of the $H_{data}$ vector and the $H_{energy}$ vector results in the specific constellation diagram shown in the vector diagram, with the reader's total transmission signal $H_{total}$ being represented by the solid and dashed bold vectors. In the signal diagram on the right, as with the signal diagrams of FIGS. 2A and 2B, the data signal $H_{data}$ is represented by the dotted line, the energy signal $H_{energy}$ by the dashed line, and the total transmission signal $H_{total}$ by the solid line.

The invention is not limited to PSK, ASK, or QAM modulation. Other types of modulation, such frequency-shift keying (FSK) and Discrete Multi-Tone (DMT), are possible. Also, the PSK and ASK modulations are not limited to binary modulation, and the QAM modulation is not limited to 4-QAM modulation.

In an embodiment, to detect the data signal $H_{data}$, the energy signal $H_{energy}$ can be measured and stored in contactless card 120. After modulation starts, the reader's total transmission signal $H_{total}$ can be measured, and then the stored energy signal $H_{energy}$ can be subtracted therefrom resulting in the data signal $H_{data}$. For QAM modulation, for example, if the energy signal is subtracted from the total transmission signal, and the result is represented as the known QAM modulation constellation diagram having the first, second, third, and fourth quadrants of a circle.

Figure 3A:
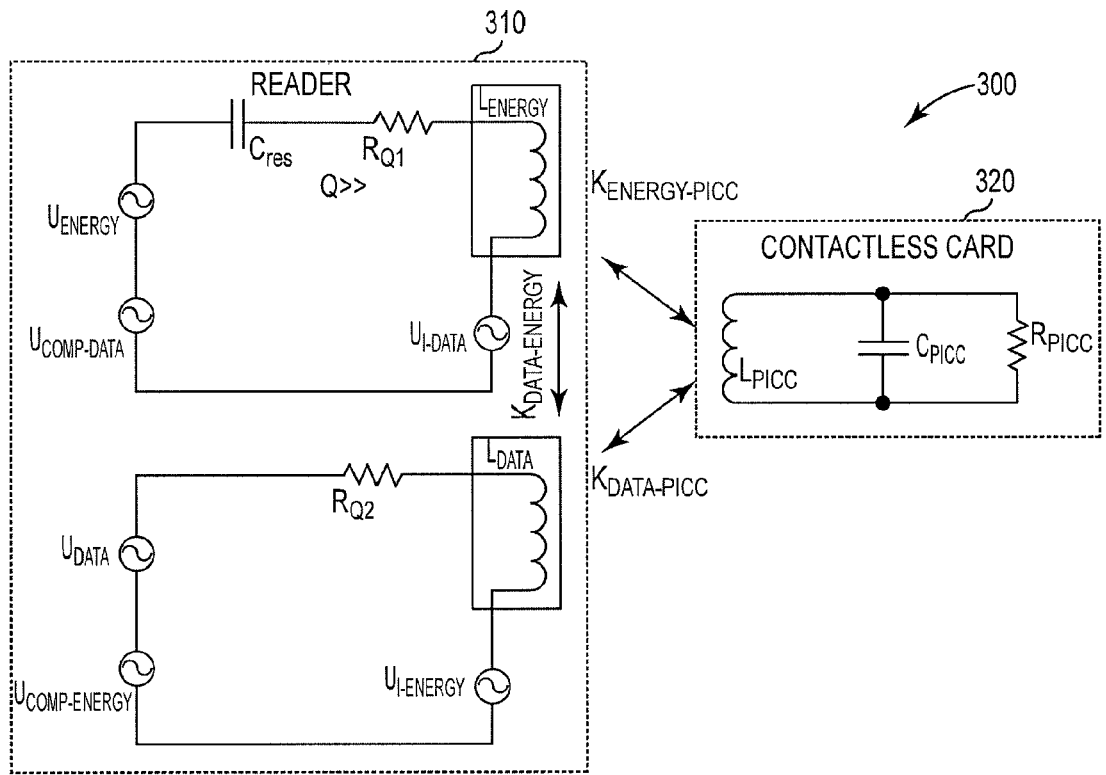
FIGS. 3A and 3B illustrate a contactless communication system according to another embodiment.
Figure 3B:
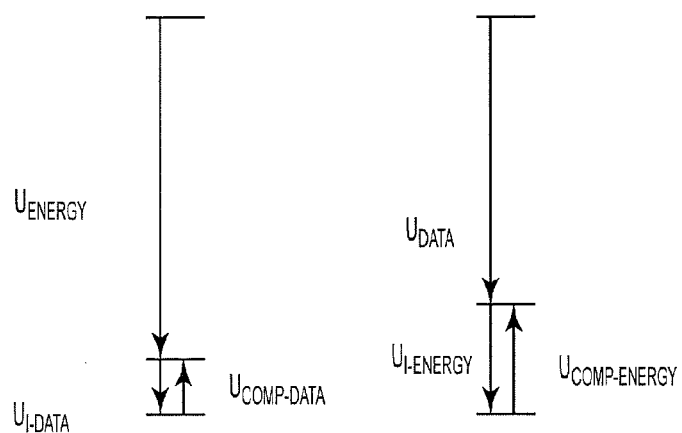

FIGS. 3A and 3B illustrate a contactless communication system according to another embodiment having voltage compensation sources. Contactless communication system 300 is similar to the contactless communication systems 100A and 100B described above with respect to FIGS. 1A and 1B, except that the signal suppression used to cancel an influence of the energy signal on the data antenna, and an influence of the data signal on the energy antenna, is done electrically rather than geometrically.

Coupling between the $L_{data}$ antenna and the $L_{energy}$ antenna is represented in FIG. 3A by coupling coefficient $k_{data-energy}$, and this coupling induces respective voltages, $U_{i-energy}$ and $U_{i-data}$, in the two antennas. Unlike the embodiments shown in FIGS. 1A and 1B, the antennas of this embodiment are not shaped, sized, and positioned in any particular geometrical manner.

To suppress an influence of the energy signal on the data antenna and the influence of the data signal on the energy antenna, two voltage compensation sources are added. One compensation source, $U_{comp-data}$, compensates for the induced voltage $U_{i-data}$ caused by the data signal $H_{data}$ in the energy antenna $L_{energy}$. The other compensation source, $U_{comp-energy}$, compensates for the induced voltage $U_{i-energy}$ caused by the energy signal $H_{energy}$ in the data antenna $L_{data}$.

FIG. 3B shows bar graphs illustrating this voltage compensation. The bar graph on the left represents the energy antenna circuit. Compensation source $U_{comp-data}$ compensates for the induced voltage $U_{i-data}$ caused by the data signal $H_{data}$, and the result is the energy generator voltage $U_{energy}$. The other bar graph on the right represents the data antenna circuit. Compensation source $U_{comp-energy}$ compensates for the induced voltage $U_{i\text{-}energy}$ caused by the energy signal $H_{energy}$ resulting in data generator voltage $U_{data}$.

Electrical cancellation does not have a specific positioning requirement for energy antenna $L_{energy}$ and data antenna $L_{data}$. It is preferable to not couple these two antennas well with one another so as to not create induced voltages (i.e., $U_{i\text{-}data}$ and $U_{i\text{-}energy}$) that are high. These antennas should be positioned such that they each couple well to contactless card antenna $L_{PICC}$, and such that the induced voltages are at a level that they can be compensated for electrically.

The other components of FIG. 3A are similar to the ones described above with respect to other embodiments, and for the sake of brevity, their descriptions will not be repeated here.

FIG. 4 illustrates a contactless communication method 400 according to an embodiment.

During the contactless communication method 400, an energy signal is generated, and a data signal is generated using a modulation scheme, such as PSK, ASK or QAM modulation, at Step 410. If necessary, a phase shift between the energy signal $H_{energy}$ and the data signal $H_{data}$ is compensated for, at Step 420. The energy signal $H_{energy}$ is transmitted/received from/to an energy antenna $L_{energy}$, at Step 430. The data signal $H_{data}$ is transmitted from the data antenna $L_{data}$, at Step 440. A voltage induced by the energy signal $H_{energy}$ in the data antenna $L_{data}$ is compensated for at Step 450, and a voltage induced by the data signal in the energy antenna $L_{energy}$ is compensated for at Step 460. As discussed above, a superposition between the energy signal $H_{energy}$ and the data signal $H_{data}$ occurs in the air.

It is appreciated that this method is not limited to the specific order of the steps shown in FIG. 4. Some of the steps may occur in a difference order, or may occur concurrently.

Figure 5:
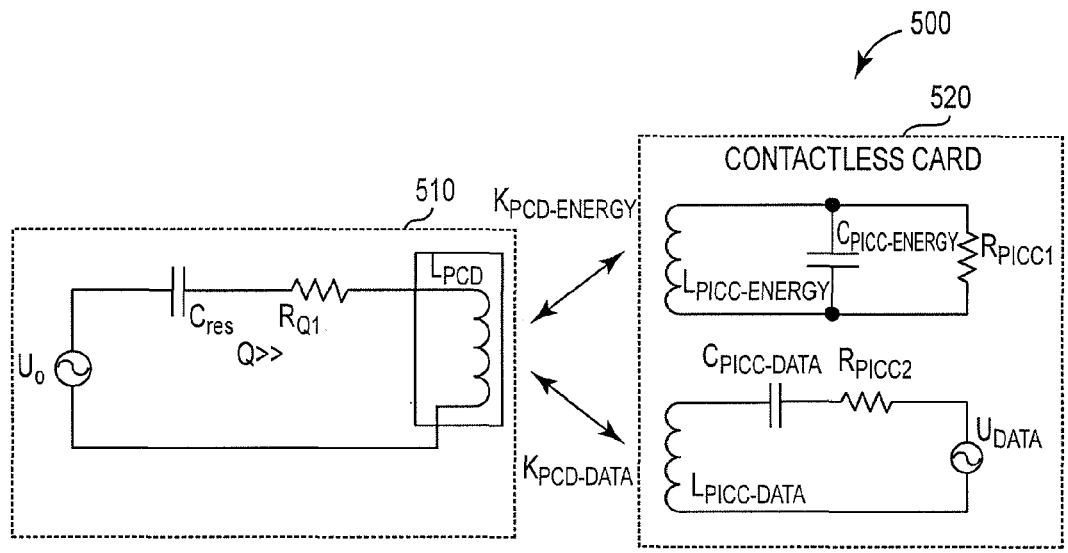
FIG. 5 illustrates a contactless communication system according to another embodiment.

FIG. 5 illustrates a contactless communication system 500 according to another embodiment. Contactless communication system 500 differs from the contactless communication systems of the embodiments described above in that instead of the additional data antenna being located in the reader, it is located in the contactless card.

Contactless reader 510 is configured the same as contactless reader 710 described above with respect to FIG. 7, and thus its description need not be repeated here.

Contactless card 520 includes energy antenna $L_{PICC\text{-}energy}$ and data antenna $L_{PICC\text{-}data}$. Energy antenna $L_{PICC\text{-}energy}$ in contactless card 520 is a narrowband antenna as in the reader implementation, and is coupled in parallel to capacitor $L_{PICC\text{-}energy}$ and to resistor $R_{PICC1}$. Unlike the reader implementation, however, energy antenna $L_{PICC\text{-}energy}$ receives, but does not transmit, energy. This is due to the fact that there is no active source in contactless card 520 as there is in reader 510. Of course the application is not meant to be limited in this respect as it is possible for contactless card 520 to include an active source.

Data antenna $L_{PICC\text{-}data}$ is a broadband antenna for sending and/or transmitting data. Data antenna $L_{PICC\text{-}data}$ has coupled thereto a capacitor $C_{PICC\text{-}data}$ and a resistor $R_{PICC2}$. Data antenna $L_{PICC\text{-}data}$ and capacitor $C_{PICC\text{-}data}$ are configured to form a resonance circuit having a low quality (Q) factor. The modulated data can be generated by contactless card 520 actively (e.g., using PSK, ASK, or QAM modulation) rather than using passive impedance modulation (i.e., backscatter or load modulation) as done previously. Data antenna $L_{PICC\text{-}data}$ is typically located in a same plane as energy antenna $L_{PICC\text{-}energy}$, though it is recognized that this is not necessarily required. Also, it should be appreciated that the particular circuit of the data antenna $L_{PICC\text{-}data}$ is merely an example, and that an alternative circuit design, such as one that does not include a resonance circuit, may be used.

The operation of contactless communication system 500 is similar to that described above with respect to FIGS. 1A and 1B, and for the sake of brevity, its description will not be detailed here.

The other components of FIG. 5 are similar to the ones described above with respect to FIGS. 1A and 1B, and for the sake of brevity, their descriptions will not be repeated here.

Figure 6:
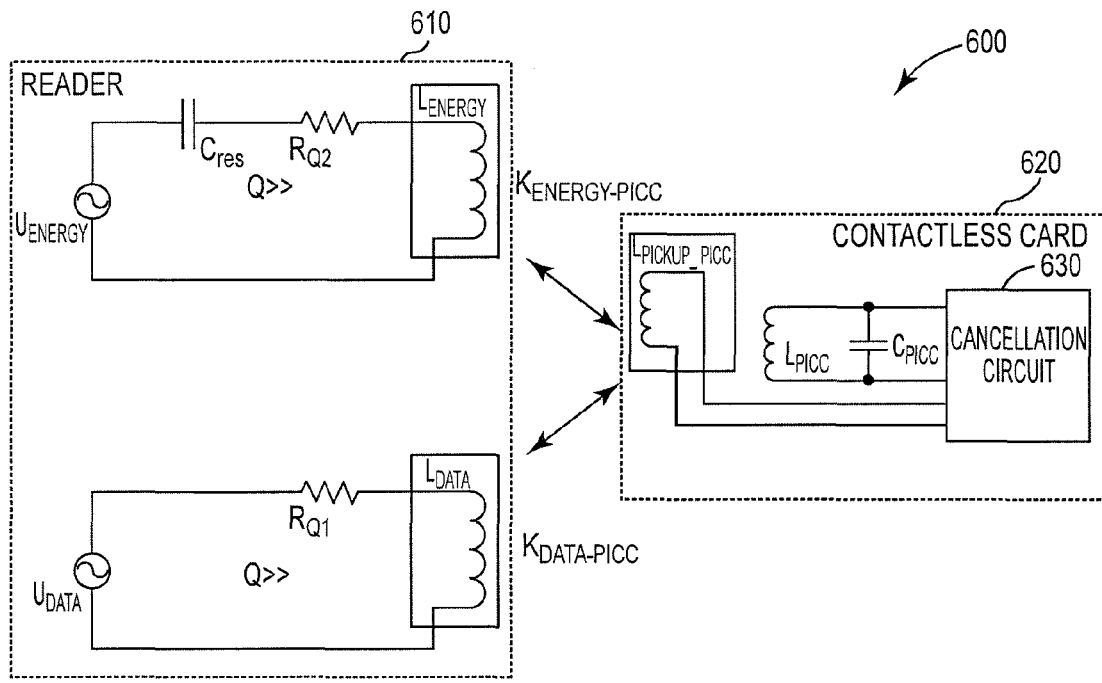
FIG. 6 illustrates a contactless communication system according to another embodiment.

FIG. 6 illustrates a contactless communication system 600 according to another embodiment.

Contactless reader 610 is configured the same as contactless reader 110A, 110B described above with respect to FIGS. 1A and 1B, and thus its description need not be repeated here.

Contactless card 620 includes a separate pickup antenna $L_{pickup\_PICC}$ and a cancellation circuit 630 to compensate for the card's transmission signal, which is generated by a current in card transmission antenna $L_{PICC}$. In operation, the pickup antenna $L_{pickup\_PICC}$ detects the card's transmission signal together with the reader's total transmission signal. The cancellation circuit 630 is configured to cancel the card's transmission signal while maintaining the reader's total transmission signal almost undistorted due to that fact that the induced voltage of the reader's total transmission signal detected by the separate pickup antenna $L_{pickup\_PICC}$ is not attenuated by the card's resonance circuit, which includes card transmission antenna $L_{PICC}$ and card capacitor $C_{PICC}$.

The specific details of cancellation circuit 630 are outside the scope of this application, and for the sake of brevity, are not included here.

The other components of FIG. 6 are similar to the ones described above with respect to other embodiments, and for the sake of brevity, their descriptions will not be repeated here.

In an alternative embodiment, any of the antennas, $L_{energy}$ and $L_{data}$, of reader 610 are modified to include a cancellation circuit similar to that of contactless card 620. Again, the specific details of such a cancellation circuit are outside the scope of this application, and for the sake of brevity, are not included here.

Although specific embodiments have been illustrated and described herein, it will be appreciated by those of ordinary skill in the art that a variety of alternate and/or equivalent implementations may be substituted for the specific embodiments shown and described without departing from the scope of the present application. This application is intended to cover any adaptations or variations of the specific embodiments discussed herein.

What is claimed is:

1. A contactless device, comprising:
   an energy antenna configured to transmit/receive a non-data modulated energy signal only; and
   a data antenna configured to transmit a data signal at a substantially similar carrier frequency as the as the non-data modulated energy signal, thereby resulting in a superposition of the data signal and the non-data modulated energy signal.

2. The contactless device of claim 1, wherein the energy antenna is a narrowband antenna.

3. The contactless device of claim 1, wherein the data antenna is a wideband antenna.

4. The contactless device of claim 1, wherein the energy antenna comprises a resonant circuit having a high quality factor, and the data antenna comprises a resonant circuit having a low quality factor.

5. The contactless device of claim 1, wherein only the energy antenna comprises a resonant circuit, and the resonant circuit has a high quality factor and is matched to resonance.

6. The contactless device of claim 1, further comprising a modulator configured to generate the data signal using one of ASK-modulation, PSK-modulation, FSK-modulation, QAM-modulation, and DMT-modulation.

7. The contactless device of claim 1, wherein the data antenna is further configured to receive a load-modulated signal.

8. The contactless device of claim 1, wherein the data antenna comprises a voltage compensation source configured to compensate for a voltage induced by the energy signal in the data antenna.

9. The contactless device of claim 1, wherein the energy antenna comprises a voltage compensation source configured to compensate for a voltage induced by the data signal in the energy antenna.

10. The contactless device of claim 1, wherein the energy antenna and the data antenna are positioned with respect to one another such that a voltage induced by the energy signal in the data antenna is geometrically cancelled.

11. The contactless device of claim 1, wherein the energy antenna and the data antenna are located in a same plane.

12. The contactless device of claim 1, wherein the contactless device is a contactless reader.

13. The contactless device of claim 1, wherein the contactless device is a contactless card.

14. The contactless device of claim 13, wherein the energy antenna is configured to only receive the energy signal.

15. A contactless communication system comprising:
a first contactless device, comprising:
an energy antenna configured to transmit/receive a non-data modulated energy signal only; and
a data antenna configured to transmit a data signal at a substantially similar carrier frequency as the as the non-data modulated energy signal, thereby resulting in a superposition of the data signal and the non-data modulated energy signal; and
a second contactless device configured to receive the superposition of the energy signal and the data signal.

16. The contactless communication system of claim 15, wherein the second contactless device comprises:
a transmission antenna configured to transmit a transmission signal;
a pickup antenna configured to receive the superposition of the energy signal and the data signal transmitted from the first contactless device, and the transmission signal; and
a cancellation circuit configured to subtract a voltage of the transmission antenna from a voltage of the pickup antenna.

17. The contactless communication system of claim 15, wherein the second contactless device comprises a single antenna configured to receive a superposition of the energy signal and the data signal.

18. A contactless device, comprising:
an energy antenna means for transmitting/receiving a non-data modulated energy signal only; and
a data antenna means for transmitting a data signal at a substantially similar carrier frequency as the as the non-data modulated energy signal, thereby resulting in a superposition of the data signal and the non-data modulated energy signal.

19. A method for transmitting a contactless signal comprising:
transmitting/receiving a non-data modulated energy signal only, from an energy antenna of a contactless device; and
transmitting a data signal from a data antenna of the contactless device at a substantially similar carrier frequency as the as the non-data modulated energy signal, thereby resulting in a superposition of the data signal and the non-data modulated energy signal.

20. The method of claim 19, wherein the energy signal is a narrowband energy signal, and the data signal is a wideband data signal.

21. The method of claim 19, further comprising compensating for a phase shift between the energy signal and the data signal.

22. The method of claim 19, further comprising generating the data signal using one of ASK-modulation, PSK-modulation, FSK-modulation, QAM-modulation, and DMT-modulation.

23. The method of claim 19, further comprising compensating for a voltage induced by the energy signal in the data antenna.

24. The method of claim 19, further comprising compensating for a voltage induced by the data signal in the energy antenna.

* * * * *